(12) United States Patent
Pine

(10) Patent No.: US 7,068,316 B1
(45) Date of Patent: Jun. 27, 2006

(54) SELECTABLE RESOLUTION IMAGE CAPTURE SYSTEM

(75) Inventor: Joshua I. Pine, Seal Beach, CA (US)

(73) Assignee: ESS Technology, Inc., Fremont, CA (US)

( * ) Notice: Subject to any disclaimer, the term of this patent is extended or adjusted under 35 U.S.C. 154(b) by 731 days.

(21) Appl. No.: 09/672,987

(22) Filed: Sep. 29, 2000

(51) Int. Cl.
*H04N 3/14* (2006.01)
*H04N 5/335* (2006.01)

(52) U.S. Cl. .................................. 348/308; 348/294
(58) Field of Classification Search ............. 348/14.12, 348/333.11
See application file for complete search history.

(56) References Cited

U.S. PATENT DOCUMENTS

| | | | | |
|---|---|---|---|---|
| 5,262,871 A | * | 11/1993 | Wilder et al. | 348/307 |
| 5,418,565 A | * | 5/1995 | Smith | 348/273 |
| 5,477,345 A | * | 12/1995 | Tse | 358/500 |
| 5,827,190 A | * | 10/1998 | Palcic et al. | 600/476 |
| 6,233,016 B1 | * | 5/2001 | Anderson et al. | 348/372 |
| 6,642,962 B1 | * | 11/2003 | Lin et al. | 348/252 |
| 2001/0017658 A1 | * | 8/2001 | Kuroiwa | 348/273 |
| 2002/0044699 A1 | * | 4/2002 | Kozuka | 382/312 |

FOREIGN PATENT DOCUMENTS

JP 06350911 A * 12/1994

* cited by examiner

*Primary Examiner*—David Ometz
*Assistant Examiner*—Yogesh Aggarwal
(74) *Attorney, Agent, or Firm*—Farjami & Farjami LLP

(57) ABSTRACT

A selectable resolution image capture system is provided having an array of photocells connected by a circuit that has a full-resolution and at least one low-resolution mode. The circuit converts electrical responses from the photocells, singly, or in grouped combinations, into digital signals. The circuit operates on both monochrome and color imagers. For monochrome imagers, a quarter-resolution mode is provided that renders the array of photocells into several four-contiguous-photocell blocks, and combines the electrical responses of the photocells of each block together. For color imagers, a quarter-resolution mode is provided that reads four same-colored photocells at a time using a one-step, three-step progression through the rows and columns of the photocell array. An image processor operates the circuit and a user interface permits a user to select between the full-resolution and low-resolution modes of the circuit to capture an image. The user interface includes automatic modes that cause the circuit to capture an image at a low resolution if lighting or power conditions disfavor a full-resolution capture.

5 Claims, 7 Drawing Sheets

SELECTABLE RESOLUTION IMAGE CAPTURE SYSTEM

BACKGROUND OF THE INVENTION

1. Technical Field

This invention relates in general to digital image processing, and in particular to a system for changing the resolution of a digital imager.

2. Related Art

Advances in digital cameras and digital image capture devices have led to cameras with the capacity to take pictures with incredibly fine resolutions. Often times, however, the camera's available resolution far exceeds what is needed for a particular purpose. For example, when no image is being recorded, a camera's viewfinder does not need to display the image at its full resolution. In such a case, capturing the image at full-resolution, only to reduce it to a lower, resolution for the viewfinder, consumes excessive power. An alternative solution, known as decimation (e.g., reading the charges only of alternating photocells), is also unsatisfactory, because it reduces the total amount of light captured by the imager.

High resolution digital image capturers can have other disadvantages. The higher an imager's resolution (i.e., the more photocells), the less light is directed to each particular photocell in the camera's photocell array. Therefore, either the photocells must be more sensitive in a high-resolution imager than in a low-resolution imager, or more light must be focused onto the imager using a longer frame rate or a wider aperture.

SUMMARY

A selectable resolution image capture system is provided to reduce the resolution of an imager in the analog domain, saving power that would be used to reduce a full-resolution image in the digital domain. The system includes a circuit that is connected to an array of photocells that produce electrical responses to light exposure. The circuit has both full- and low-resolution modes. In the full-resolution mode, the circuit converts the electrical response of each photocell into a digital signal. In the low-resolution mode, the circuit combines the charges produced by groups of photocells together and converts the combined charge of each group into a digital signal.

Another selectable resolution image capture system is provided having an image processor. The image processor supplies different operating signals to the circuit corresponding to the full-resolution and low-resolution modes. In another selectable resolution image capture system, a detector detects whether there is a low light condition. If low light conditions exist, the system captures the image using the low-resolution mode of the circuit. In another selectable resolution image capture system, a detector detects whether there is a low power condition. If a low power condition exists, the system captures the image using the low-resolution mode of the circuit. In yet another selectable resolution image capture system, a user interface permits a user to select from among a plurality of image resolutions.

Selectable resolution image capture systems are provided for both monochrome and color imagers. For monochrome imagers, a quarter-resolution mode can render the array of photocells into several four-contiguous-photocell blocks, and combine the electrical responses of the photocells of each block together. For color imagers having an alternating red, green, red, green, and green, blue, green, blue photocell pattern, a different quarter-resolution mode is provided. The color imager's quarter-resolution mode reads four same-colored photocells at a time and steps through the columns and rows of the photocell array with an alternating one-step, three-step progression.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
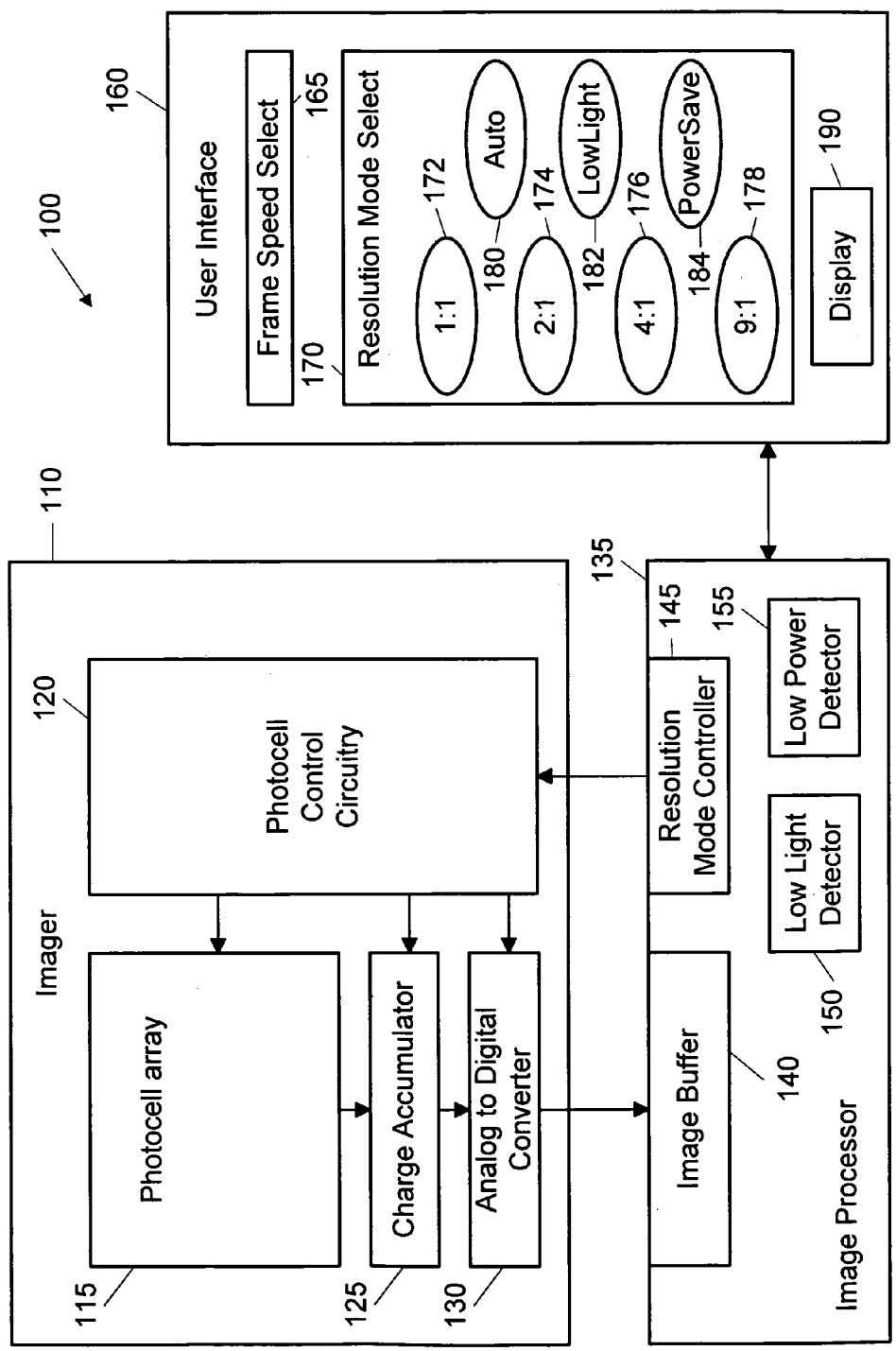
FIG. 1 is a block diagram illustrating a selectable resolution image capture system.

FIG. 1 is an illustration of a selectable resolution image capture system 100 comprising an imager 110, an image processor 135, and a user interface 160. The imager 110 may have a photocell array 115, photocell control circuitry 120, a charge accumulator 125, and an analog-to-digital converter 130. The photocell array 115 comprises a plurality of photodiodes, phototransistors, or other light-sensitive devices that produce an electrical response corresponding to the intensity and duration of light focused upon it. Photocell control circuitry 120 controls the timing and duration at which the photocell array 115 is exposed to an image. Photocell control circuitry 120 also controls the timing and sequence at which the charges produced by each photocell are transferred to the charge accumulator 125. The analog-to-digital converter 130 converts charges received by the charge accumulator 125 into digital form.

The image processor 135 comprises an image buffer 140 for receiving digital signals from the analog-to-digital converter 130. The image processor 135 may also comprise a resolution mode controller 145 for controlling the resolution when a captured image is converted to digital signals. The image processor 135 may optionally comprise a low light detector 150 and a low power detector 155. These detectors 150 and 155 may be used to signal the imager 110 to capture an image with a less-than-full resolution when low light or low power conditions exist.

The selectable resolution image capture system 100 may also support a user interface 160. The user interface 160 comprises a frame speed controller 165, a resolution mode controller 170, and a display 190. The frame speed controller 165 controls the frame rate at which an image is captured by the imager 110. The faster the frame rate, the more light is needed to capture an adequate image. In very high speed or low light applications, it may be necessary to capture the image with a lower resolution to compensate for the increased speed and lower light conditions. Display 190 is any device suitable for displaying a preview of an image to be captured or an image that has already been captured.

The resolution mode controller 170 allows a user to select between full resolution mode 172, half-resolution mode 174, quarter-resolution mode 176, and one-ninth-resolution mode 178. The resolution mode select control 170 also comprises a low-light mode 182, a power-save mode 184, and an automatic mode 180. The low light mode 182 instructs the image processor 135 and imager 110 to capture an image at a reduced resolution whenever lighting conditions favor a low-resolution capture.

The low-light mode 182 utilizes the low-light detector 150 to determine whether lighting conditions favor a low-resolution capture. The power-save mode 184 instructs the image processor 135 and imager 110 to capture an image with reduced resolution whenever low power conditions prevent an image from being captured at full resolution. The power-save mode 184 utilizes low power detector 155 to determine whether the charge of a battery (not shown) supplying power to the imager 110 disfavors full-resolution capture. The automatic mode 180 instructs the image processor 135 and imager 110 to capture images with reduced resolution whenever either low-light, low-power, or frame-speed conditions favor a lower resolution.

A variety of different configurations of the selectable resolution image capture system 100 are possible. The imager 110 may be a complimentary metal oxide semiconductor ("CMOS") imager or a charge coupled device ("CCD"). The entire selectable resolution image capture system 100 may also be disposed within a single package, such as a camera. Alternatively, the imager 110, the image processor 135, and the user interface 160 may be located remotely from one another, communicating with each other through electromagnetic signals. The selectable resolution image capture system 100 may also be part of either a still camera system or a video camera system.

Different aspects of the selectable resolution image capture system 100 illustrated in FIG. 1 could be omitted, substituted, modified, or supplemented without departing from many of the inventive aspects of this invention. For example, the charge accumulator 125 may consist of a capacitor on a bus that is electronically linked to all of the photocells of the photocell array 115. Alternatively, the charge accumulator 125 could be substituted with a plurality of capacitors serving each of the photocells of the photocell array 115. Furthermore, the low-light and low-power detectors 150 and 155 of the image processor 135 could be omitted. The frame speed select 165 and the resolution mode select control 170 could be omitted.

Figure 2:
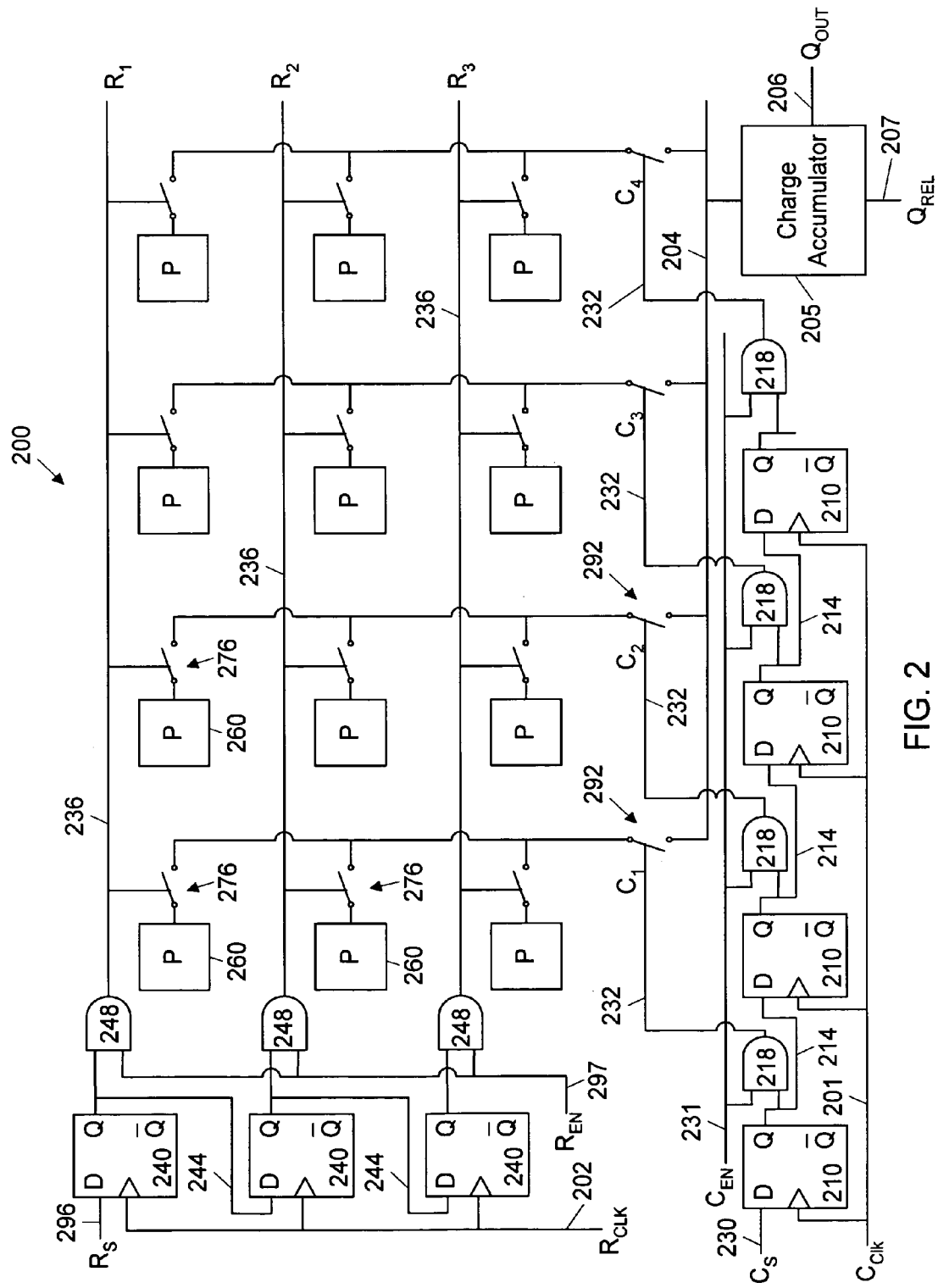
FIG. 2 is a circuit diagram illustrating a portion of a selectable resolution image capture circuit.

FIG. 2 illustrates a simplified circuit diagram of a portion of a selectable resolution image capture circuit 200. The circuit 200 is provided with an array of photocells 260 arranged in a rectilinear pattern of rows and columns. Because of paper size constraints, only three rows and four columns are shown. Each photocell 260 produces an electrical charge in response to light. A plurality of row switches 276 connected to each photocell 260, and column switches 292 connected to each row, control the transfer of charge from the photocells 260 to a charge transfer bus 204.

Each column switch 292 is managed by a column transfer control line 232. The column transfer control lines 232 are held high by a coincidence of high signals on the column enable line 231 and at an output 214 from a read-column flip-flop 210. In this illustrative embodiment, the read-column flip-flops 210 are positive-edge-triggered D-type flip-flops. The output 214 of each read-column flip-flop 210 is serially connected to the next read-column flip-flop 214, forming a one-bit shift register with a separate output 214 for each column in the array of photocells 260. A column clock line 201 controls the timing of each read-column flip-flop 210. A high signal on the column select line 230 fed into the first column-row flip-flop 210 starts the column-reading process. The column enable line 231, may be ANDed to each output 214 through AND gates 218, making it possible to skip columns or change the order in which the columns are read.

Each row of row switches 276 is managed by a row transfer control line 236. The row transfer control lines 236 are held high by a coincidence of high signals on the row enable line 297 and at an output 244 of a read-row flip-flop 240. In this illustrative embodiment, the read-row flip-flops 240 are positive-edge-triggered D-type flip-flops. The output 244 of each read-row flip-flop 240 is serially connected to the next read-row flip-flop 240, forming a one-bit shift register with a separate output 244 for each row in the array of photocells 260. A row clock line 202 controls the timing of each read-row flip-flop 240. A high signal on the row select line 296 fed into the first read-row flip-flop 240 starts the row-reading process. The row enable line 297, which is ANDed to each output 244 through AND gates 248, makes it possible to skip rows or change the order in which rows are read.

At various sequential intervals the charge accumulated by each photocell 260 is transferred to a charge accumulator 205 (e.g., a capacitor) via the photocell charge transfer bus 204. The timing and sequence at which these photocell charges are transferred are controlled by the signals carried by the column and row clock lines 201 and 202, the column and row select lines 230 and 296, and the column and row enable lines 231 and 297.

The output 206 of the charge accumulator 205 is fed into an analog-to-digital converter (not shown) to produce a digital signal. After an analog-to-digital conversion is done, the charge in the charge accumulator 205 is discharged by means of a discharge control signal 207. This clears the way for the charge produced by the next photocell 260 or group of photocells 260 to be accumulated by the charge accumulator 205 and converted into a digital signal.

The circuit 200 provides ample structure for controlling the resolution of the circuit 200. When operating the circuit 200 in full-resolution mode, charges are transferred from the photocells 260 to the charge accumulator 205 one photocell 260 at a time. This is accomplished by enabling only one row switch 276 and column switch 292 at a time. When operating the circuit 200 in half-resolution mode, charges are transferred from two photocells 260 to the charge accumulator 205 at a time. This is accomplished by enabling two row switches 276 or two column switches 292 at a time. The circuit 200 may be operated in quarter-resolution mode by enabling two row switches 276 and two column switches 292 at a time. Furthermore, the circuit 200 may be operated in one-ninth resolution mode by enabling three column switches 276 and three row switches 292 at a time.

As with FIG. 1, various aspects of the selectable resolution image capture circuit 200 could be omitted, substituted, modified, or supplemented without departing from many of the inventive aspects of this invention. The charge accumulator 205, for example, could be substituted with individual capacitors connected to each photocell 260. Furthermore, the various row and column components could be swapped, decreasing the number of row switches 276 but causing a corresponding increase in the number of column switches 292. Such modifications would not substantively change the functionality of the invention, although they could necessitate a different sequence of signals to operate the column and row clock lines 201 and 202, the column and row select lines 230 and 296, and the column and row enable lines 231 and 297.

Figure 3:
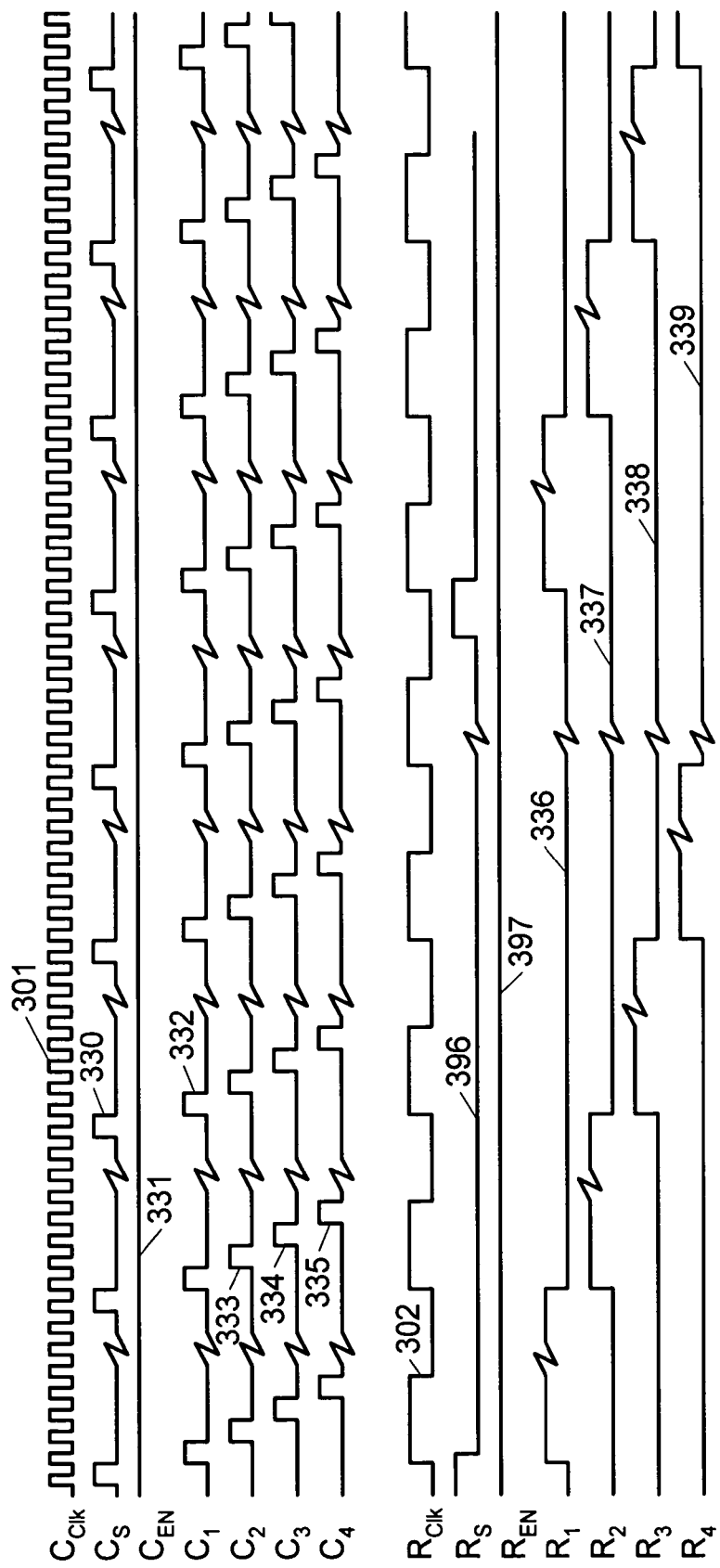
FIG. 3 is an illustration of a pulse diagram for operating the circuit of FIG. 2 in full resolution mode.

FIG. 3 is an illustration of a pulse diagram for operating the circuit 200 of FIG. 2 in full resolution mode. FIG. 3 shows a column clock signal 301 and a row clock signal 302. The row clock signal 302 oscillates at a fraction of the speed of the column clock signal 301. This causes the circuit 200 to read all of the photocells 260 in each row in columnar sequence, before proceeding to the next row.

A column select pulse 330 near the beginning of each row clock signal 302 cycle begins each column-reading sequence. The pulse 330 cascades through the column-read flip-flops 210 with each succeeding column clock signal 301 cycle. Because the column enable signal 331 is kept high, the column transfer control signals 332–335 mirror the signals (not shown) carried by cascading flip-flop outputs 214. Column transfer control signals 332–335 are denoted as $C_1, C_2, C_3$, and $C_4$ to symbolize column 1, column 2, column 3, etc. Whenever a column transfer control signal 332–335 is high, the corresponding column switch 292 is closed.

A row select pulse 396 begins each row-reading sequence. The pulse 396 cascades through the row-read flip-flops 240 with each succeeding row clock signal 302 cycle. Because the row enable signal 397 is kept high, the row transfer control signals 336–339 mirror the signals (not shown) carried by cascading flip-flop outputs 244. Row transfer control signals 336–339 are denoted as $R_1, R_2, R_3$, and $R_4$ to symbolize row 1, row 2, row 3, etc. Whenever a row transfer control signal 336–339 is high, the corresponding row switch 276 is closed. Whenever a column switch 292 and a row switch 276 are simultaneously closed, the charge produced by the corresponding photocell 260 is transferred to the charge accumulator 205.

Figure 4:
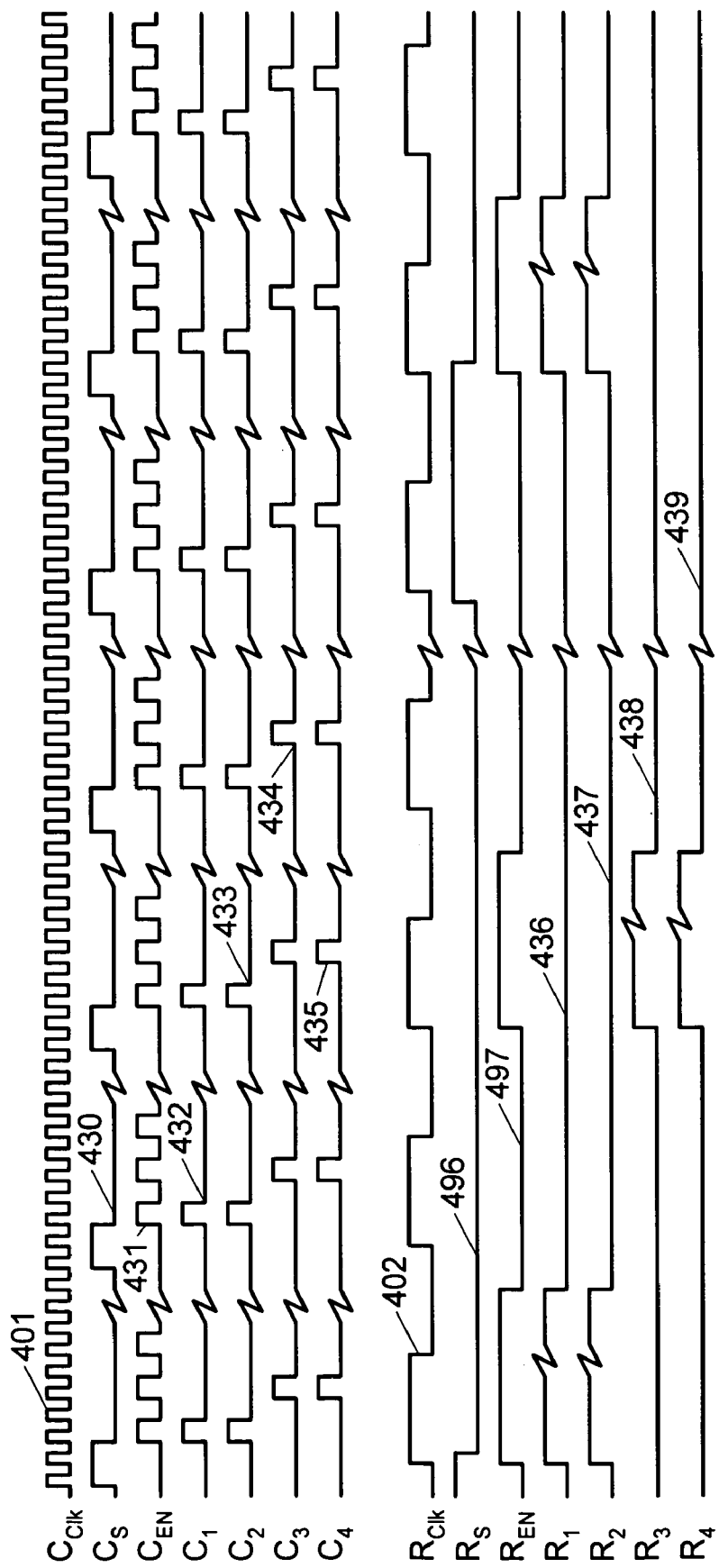
FIG. 4 is an illustration of a pulse diagram for operating the circuit of FIG. 2 in quarter resolution mode.

FIG. 4 is an illustration of a pulse diagram for operating the circuit 200 of FIG. 2 in a quarter-resolution mode. FIG. 4 shows a column clock signal 401 and a row clock signal 402. As with FIG. 3, the row clock signal 402 oscillates at a fraction of the speed of the column clock signal 401, causing the circuit 200 to read all of the photocells 260 in each row before proceeding to the next row.

As with FIG. 3, a column select pulse 430 near the beginning of each row clock signal 402 cycle begins each column-reading sequence. However, this column select pulse 430, unlike the column select pulse 330 of FIG. 3, is enabled for two successive column clock signal 401 cycles. As this two-cycle width pulse 430 cascades through the column-read flip flops 210, each column-read flip-flop outputs 214 is held high for two column clock signal 401 cycles. Accordingly, the high signals (not shown) at outputs 214 of each pair of adjacent column-read flip-flops 210 partially overlap.

Also in contrast with FIG. 3, the column enable signal 431 oscillates at one-half of the frequency of the column clock signal 401. This signal 431 is ANDed with the signals (not shown) at the flip-flop outputs 214 to produce column transfer control signals 432–435. The column enable signal 431 ensures that each column is read only once per row clock signal 402 cycle. The signal 431 also ensures that each column transfer control signal 432–435 is paired with only one other column transfer control signal 432–435. If the column enable signal 431 were kept perpetually high, then the column transfer control signal 433 would be paired, at different times, with both column transfer control signal 432 and with column transfer control signal 434. This would not effectively reduce the resolution of the imager and would blur the charges held by the photocells 260. The row clock signal 402, row select signal 496, row enable signal 497, and row transfer control signals 436–439 operate in similar fashion, but at a scale commensurate with the width of the row clock signal 402 cycle.

The pulse diagram of FIG. 4 causes the array of photocells 260 to be read out in groups of four photocells at a time. Stated another way, the pulse diagram of FIG. 4 separates the array of photocells 260 into non-overlapping square groups of four contiguous photocells, and then sequentially transfers the combined charges of the photocells in each group to the charge accumulator 205. This reduces the pixel resolution by a factor of four. Each group of four photocells 260 creates, in effect, a super pixel that has on average approximately four times as much charge as would a single photocell 260. The pulse diagram of FIG. 4 is well-adapted for use with a monochrome imagers.

Figure 5:
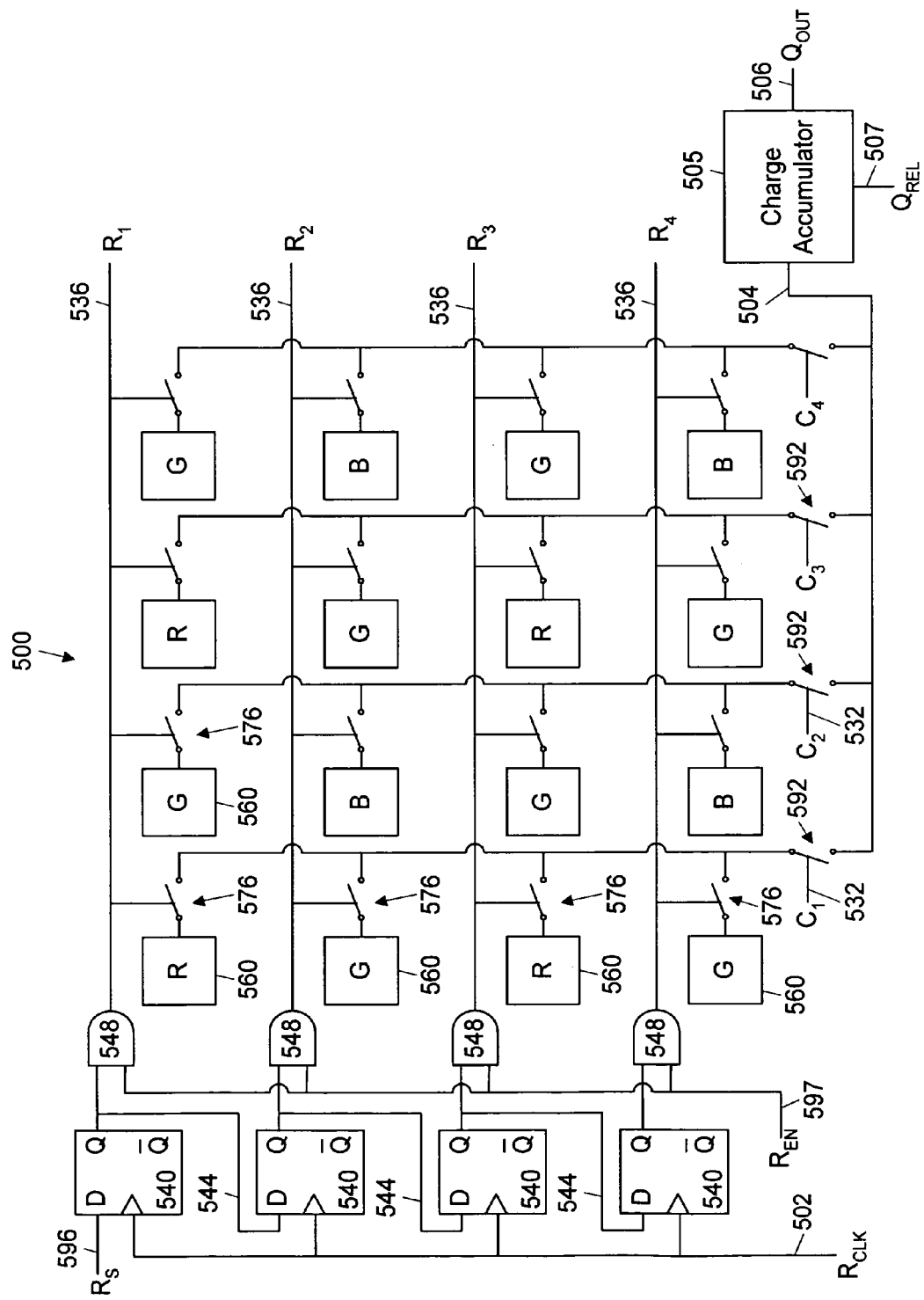
FIG. 5 is circuit diagram illustrating a portion of a selectable resolution color image capture circuit.

Color imagers comprising a plurality of red, green, and blue photocells present a different signal control challenge. FIG. 5 illustrates a simplified circuit diagram of a portion of a selectable resolution image capture circuit 500 for a color imager. The circuit 500 is provided with a plurality of rows and columns of red, green, and blue photocells 560 arranged in alternating patterns of red, green, red, green and green, blue, green, blue. Because of paper size constraints, only four rows and four columns are shown. In this illustrative embodiment, approximately half of the photocells 560 are green (i.e., responsive substantially only to green light), one quarter are red (i.e., responsive substantially only to red light), and another quarter are blue (i.e., responsive substantially only to blue light). Providing a greater proportion of green photocells facilitates more natural-looking photographic reproductions of an image because the eyes are more sensitive to green light than red or blue light.

A plurality of row switches 576 connected to each photocell 560, and column switches 592 connected to each row, control the transfer of charge from the photocells 560 to a charge transfer bus 504. Each column switch 592 is managed by a column transfer control line 532. Circuitry equivalent to the circuitry controlling the column transfer control lines 232 of FIG. 2 also control the column transfer control lines 532, but is not shown because of space constraints. This circuitry includes a column clock line, a column select line, and a column enable line.

Each row of row switches 576 is managed by a row transfer control line 536. The row transfer control lines 536 are held high by a coincidence of high signals on the row enable line 597 and at an output 544 of a read-row flip-flop 540. In this illustrative embodiment, the read-row flip-flops 540 are positive-edge-triggered D-type flip-flops. The output 544 of each read-row flip-flop 540 is serially connected to the next read-row flip-flop 540, forming a one-bit shift register with a separate output 544 for each row in the array of photocells 560. A row clock line 502 controls the timing of each read-row flip-flop 540. A high signal on the row select line 596 fed into the first read-row flip-flop 540 starts the row-reading process. The row enable line 597, which is ANDed to each output 544 through AND gates 548, makes it possible to skip rows or change the order in which rows are read.

At various sequential intervals the charge accumulated by each photocell 560 is transferred to a charge accumulator 505 (e.g., a capacitor) via a photocell charge transfer bus 504. The timing and sequence at which these photocell charges are transferred are controlled by the signals carried by the column clock, select, and enable lines (not shown), and the row clock, select, and enable lines 502, 596, and 597.

The output 506 of the charge accumulator 505 is fed into an analog-to-digital converter (not shown) to produce a digital signal. After an analog-to-digital conversion is done, the charge in the charge accumulator 505 is discharged by means of a discharge control signal 507. This clears the way for the charge produced by the next photocell 560 or group of photocells 560 to be accumulated by the charge accumulator 505 and converted into a digital signal.

The circuit 500 provides ample structure for controlling the resolution of the circuit 500. When operating the circuit 500 in full resolution mode, charges are transferred from the photocells 560 to the charge accumulator 505 one photocell 560 at a time. This is accomplished by enabling only one row switch 576 and column switch 592 at a time as shown in, for example, the pulse circuit of FIG. 3.

Operating the circuit 500 in a lower resolution mode may require a different approach with a color imager than with a monochrome imager. Contrasted with a monochrome imager, the charges of adjacent photocells can be grouped and read together, with a color imager, it is advantageous, in some circumstances, to group only same-colored photocells together.

One sequence to operate the circuit 500 in half-resolution mode is to enable one row while simultaneously enabling the first and third columns, then the second and fourth columns, then the fifth and seventh columns, then the sixth and eighth columns, etc., until all of the columns are read. This alternating one-step, three-step, split-column-pair progression is then repeated for each row until the entire array of photocells 560 is read. In this way, the circuit 500 reads the entire array of photocells 560 out with the same alternating red, green, red, green, and green, blue, green, blue patterns as it does in full-resolution mode. Moreover, little or no modification of any digital image processing circuitry (not shown) used to process a full-resolution image is needed to process a half-resolution image.

A sequence to operate the circuit 500 in quarter-resolution mode is to execute the above-described one-step, three-step, split-column-pair progression while enabling the first and third rows together, then the second and fourth rows together, then the fifth and seventh rows together, then the sixth and eighth rows, etc., until all of the photocells 560 are read. In other words, the one-step, three-step progression would be executed for both a split pair of rows and a split pair of columns. This particular quarter-resolution mode sequence effectively renders the array of photocells 560 into discrete, non-overlapping sixteen-photocell blocks. Each block is essentially rendered as four intersecting supercells, including a blue supercell, a red supercell, and two green supercells.

A sequence to operate the circuit 500 in ninth-resolution mode is similar to the sequence described for operating the circuit 500 in quarter-resolution mode. Instead of two split columns and two split rows being enabled together, three split columns and three split rows are enabled together. A one-step, five-step progression is used for both the split row triplet and the split column triplet. These principles can be extended to other low-resolution modes.

Figure 6:
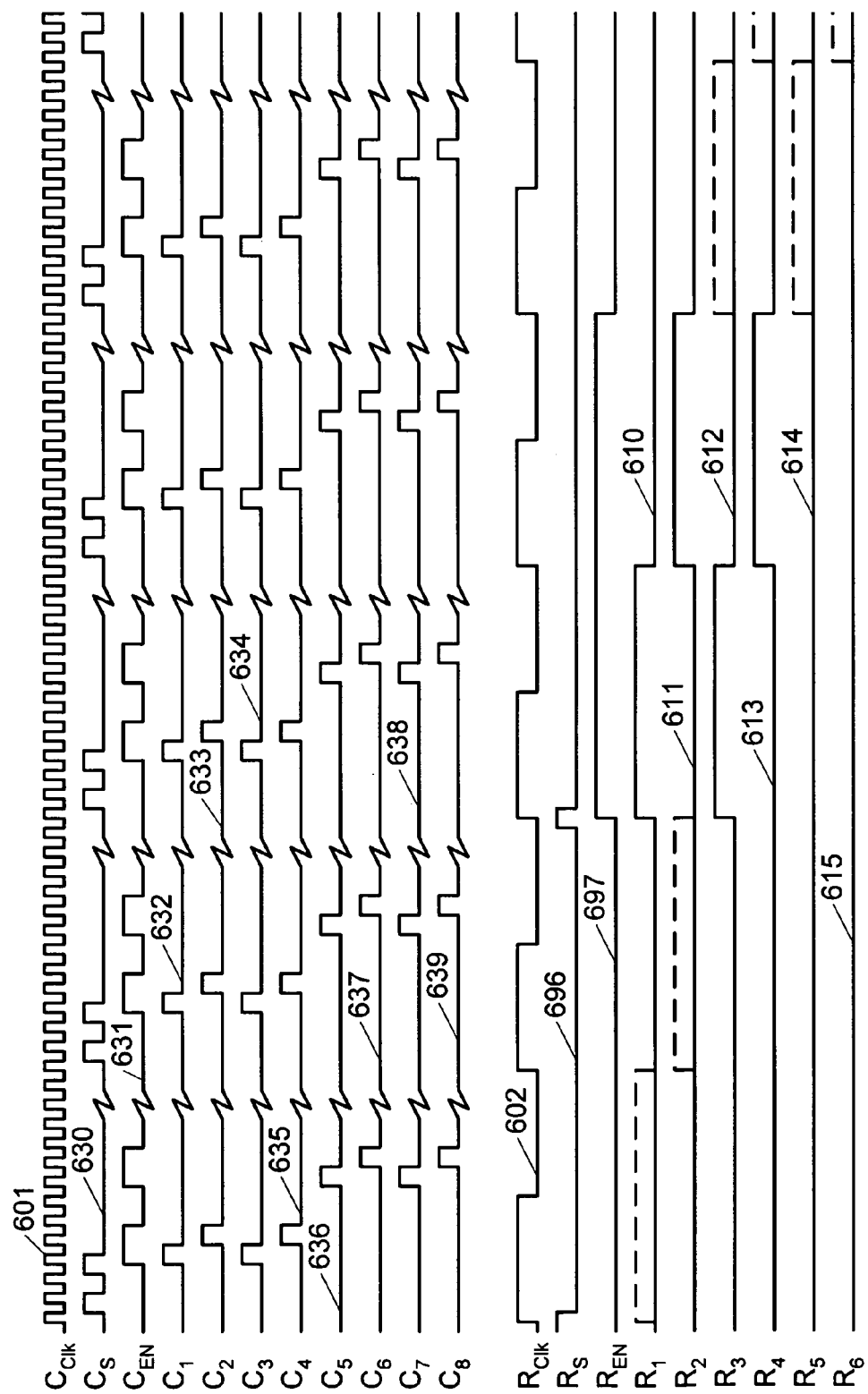
FIG. 6 is an illustration of a pulse diagram for operating the circuit of FIG. 5 in quarter resolution mode.

FIG. 6 is an illustration of a pulse diagram for operating the circuit 500 of FIG. 5 in quarter resolution mode. FIG. 6 shows a column clock signal 601 and a row clock signal 602. The row clock signal 602 oscillates at a fraction of the speed of the column clock signal 601. This causes all of the columns of the array of photocells 560 to be scanned for each pair of rows that is read.

A column select signal 630 consisting of a pair of pulses separated by a single column clock signal 601 cycle begins each column-reading sequence. As this split two-pulse column select signal 630 cascades through the column-read flip flops (not shown in FIG. 5, but compare 210 of FIG. 2), each column-read flip-flop is held high for a clock cycle, then low for a clock cycle, then high for another clock cycle, and then low for the remainder of the left-to-right column-reading sequence.

The column enable signal 631 alternates at one-fourth the frequency of the column clock signal 601. This signal 631 is ANDed with the signals (not shown) at the column-read flip-flop outputs (also not shown) to produce column transfer control signals 632–639. The column enable signal 631 ensures that each column is read only once per row clock signal 602 cycle. The signal 631 also ensures that each column transfer control signal 632–639 is paired with only one other column transfer control signal 632–639. The combination also results in the alternating one-step (i.e., one clock cycle), three-step (i.e., three clock cycles) column-reading progression visible in FIG. 6.

The row clock signal 602, row select signal 696, row enable signal 697, and row transfer control signals 610–615 operate in similar fashion to their column-based equivalents, but at a scale commensurate with the width of one cycle of the row clock signal 602. Dashed lines on the row transfer control signals 610–615 illustrate what the signals would be if the row enable signal 697 were kept perpetually high. The dashed lines also illustrate how the row enable signal 697 transforms the stair-step progression of the row flip-flop outputs 540 (FIG. 5) into a one-step, three-step progression.

The pulse diagram of FIG. 6 causes the array of photocells 560 to be read out in groups of four photocells at a time. From another perspective, the pulse diagram of FIG. 6 separates the array of photocells 560 into intersecting groups of same-colored photocells 560. The pulse diagram sequentially transfers the combined charges of the photocells 560 of each group to the charge accumulator 505, reducing the pixel resolution by a factor of four. Each group of four photocells 560 creates, in effect, a super pixel that has on average approximately four times as much charge as would a single photocell 560.

Figure 7:
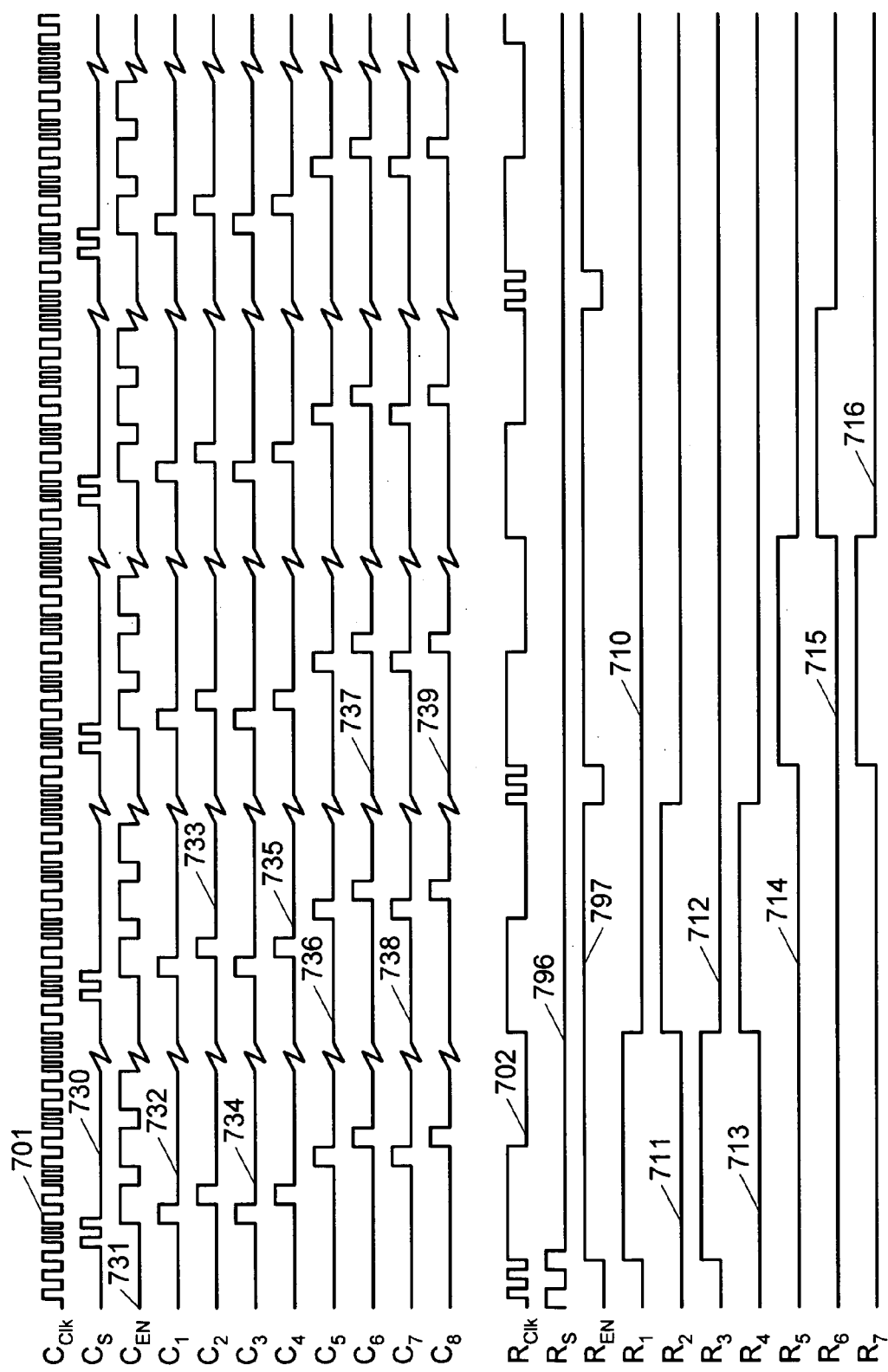
FIG. 7 is an illustration of a modified pulse diagram for operating the circuit of FIG. 5 in quarter resolution mode.

Capturing an image in low-resolution mode presents several speed-enhancement opportunities. For instance, the frame speed at which an image is captured can be accelerated up to four times as fast for quarter-resolution mode than for full-resolution mode, because charges from grouped photocells 560 are combined. It is also possible to accelerate the speed at which the array of photocells 560 is read. It is apparent from FIG. 6 that during the three-step phase of the row- and column-reading progressions, there are two clock cycles during which no charge is transferred from a photocell 560 to the charge accumulator 505. Because the clock speeds of the column and row clock signals 601 and 602 are kept the same, the array of photocells 560 is read at the same speed in quarter-resolution mode as it is in full-resolution mode. The read-rate can be accelerated by speeding up the column and row clock signals 601 and 602 during the three-step phases of the row- and column-reading progressions. FIG. 7 presents just such an embodiment.

FIG. 7 is an illustration of a modified pulse diagram for operating the circuit 500 of FIG. 5 in quarter resolution mode. This embodiment takes advantage of the speed-enhancement opportunities created by capturing an image at a lower resolution. Column and row clock signals 701 and 702 are provided that oscillate at variable frequencies. During the three-step phase of the column-reading process, the column clock signal 701 is accelerated for a period of two cycles. Likewise, during the three-step phase of the row-reading process, the row clock signal 702 is accelerated for a period of two cycles. In short, the column and row clock signals 701 and 702 are accelerated only when no charge is being transferred from the photocells 560 (FIG. 5) to the charge accumulator 505.

A first pulse of a column select signal 730 is introduced just before the rising edge of the accelerated column clock signal 701. Two clock cycles later, a second pulse of the column select signal 730 is introduced. These pulses cascade through column-read flip-flops (not shown, but comparable to those shown in FIG. 2), producing outputs (not shown) that are ANDed with a clock enable signal 731 to produce column transfer control signals 732–739. The pulse widths of the column transfer control signals 732–739 are equal to one normal column clock signal 701 cycle.

The signals operating the row-read rate operate similarly. A first pulse of a row select signal 796 is introduced just before the rising edge of the accelerated row clock signal 702. Two clock cycles later, a second pulse of the row select signal 796 is introduced. These pulses cascade through row-read flip-flops 540 (FIG. 5), producing outputs (not shown) that are ANDed with a clock enable signal 797 to produce row transfer control signals 710–716. The pulse widths of the row transfer control signals 710–716 are equal to one normal column clock signal 701 cycle.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

I claim:

1. A selectable resolution image capture system comprising:
   an imager having a plurality of photocells that produce an analog electrical response to light exposure;
   a circuit that converts the electrical responses of the plurality of photocells into digital signals;
   the circuit having a full-resolution mode and a low-resolution mode;
   an image processor that operates the circuit and selects between the full-resolution and low-resolution modes of the circuit to capture an image, where the image processor detects whether there is a low incident light condition, and in response to detecting the low incident light condition, the image processor switches from the full-resolution mode to the low-resolution mode of the circuit and captures the image using the low-resolution mode of the circuit;
   a row clock signal operating at a first clock rate;
   a column clock signal operating at a second clock rate; and
   a charge accumulator configured to accumulate charges from selected photocells during first clock cycles;
   wherein the image processor increases the first clock rate and the second clock rate during second clock cycles when the charge accumulator is not accumulating charges.

2. A selectable resolution image capture system comprising:
   an imager having a plurality of photocells that produce an analog electrical response to light exposure;
   a circuit that converts the electrical responses of the plurality of photocells into digital signals;
   the circuit having a full-resolution mode and a low-resolution mode;
   an image processor that operates the circuit and selects between the full-resolution and low-resolution modes of the circuit to capture an image, where the image processor detects whether there is a low power condition, and in response to detecting the low power condition, the image processor switches from the full-resolution mode to the low-resolution mode of the circuit and captures the image using the low-resolution mode of the circuit;
   a row clock signal operating at a first clock rate;
   a column clock signal operating at a second clock rate; and
   a charge accumulator configured to accumulate charges from selected photocells during first clock cycles;
   wherein the image processor increases the first clock rate and the second clock rate during second clock cycles when the charge accumulator is not accumulating charges.

3. A selectable resolution image capture system comprising:
   an imager having a plurality of photocells that produce an analog electrical response to light exposure;
   a circuit that converts the electrical responses of the plurality of photocells into digital signals, the circuit having a full-resolution mode and a low-resolution mode;
   an image processor that operates the circuit and selects between the full-resolution and low-resolution modes of the circuit to capture an image;
   a row clock signal operating at a first clock rate;
   a column clock signal operating at a second clock rate; and
   a charge accumulator configured to accumulate charges from selected photocells during first clock cycles;
   wherein the image processor increases the first clock rate and the second clock rate during second clock cycles when the charge accumulator is not accumulating charges.

4. A method of selecting a resolution of an image by an image capture system, the method comprising:
   producing an analog electrical response to light exposure using a plurality of photocells;
   converting the electrical responses of the plurality of photocells into digital signals using a circuit having a full-resolution mode and a low-resolution mode;
   detecting whether there is a low incident light condition for the image;
   switching from a full-resolution mode to a low-resolution mode in response to detecting the low incident light condition;
   capturing the image using the low-resolution mode of the circuit;

providing a row clock signal operating at a first clock rate;
providing a column clock signal operating at a second clock rate;
accumulating charges from selected photocells using a charge accumulator during first clock cycles; and
increasing the first clock rate and the second clock rate during second cycles, when the charge accumulator is not accumulating charges.

5. A method of selecting a resolution of an image by an image capture system, the method comprising:
producing an analog electrical response to light exposure using a plurality of photocells;
converting the electrical responses of the plurality of photocells into digital signals using a circuit having a full-resolution mode and a low-resolution mode;
providing a row clock signal operating at a first clock rate;
providing a column clock signal operating at a second clock rate;
accumulating charges from selected photocells using a charge accumulator during first clock cycles; and
increasing the first clock rate and the second clock rate during second cycles, when the charge accumulator is not accumulating charges.

* * * * *